United States Patent [19]

Scibilia

[11] 3,910,692
[45] Oct. 7, 1975

[54] FILM HANDLING CASSETTE ASSEMBLY
[75] Inventor: Peter A. Scibilia, Westwood, Mass.
[73] Assignee: Polaroid Corporation, Cambridge, Mass.
[22] Filed: Jan. 2, 1974
[21] Appl. No.: 429,726

[52] U.S. Cl.................. 352/130; 352/78 R; 354/275
[51] Int. Cl.² ........................................ G03C 11/00
[58] Field of Search................ 352/130, 78 R, 78 C; 354/275

[56] References Cited
UNITED STATES PATENTS

| | | | |
|---|---|---|---|
| 3,208,686 | 9/1965 | Edwards | 352/78 R |
| 3,389,953 | 6/1968 | Gerry | 352/78 R |
| 3,479,112 | 11/1969 | Lester | 352/78 R |
| 3,641,896 | 2/1972 | Downey | 352/130 |
| 3,722,387 | 3/1973 | Walther | 352/78 C |
| 3,756,707 | 9/1973 | Sharp | 352/78 R |
| 3,785,725 | 1/1974 | Batter | 352/130 |

Primary Examiner—Monroe H. Hayes
Attorney, Agent, or Firm—William A. Danchuk; Edward S. Roman

[57] ABSTRACT

A film handling cassette assembly having first and second housing sections adapted to be joined during manufacturing for forming a relatively flat closed container for a strip of photographic film. A lateral space or gap is provided between portions of the first and second housing sections when they are mated for facilitating the subsequent joining of the two. A securing arrangement, provided within the cassette assembly, releasably secures both housing sections together and insures the precise lateral location of one of the housing sections relative to the other for providing an even spacing of the lateral gap about the periphery of the housing sections. Additionally, the securing arrangement is operative to provide a spacing arrangement between deformable sections of the first and second housing sections when the two are joined for preventing any frictional binding engagement of the housing sections with any movable components located within the cassette assembly.

12 Claims, 6 Drawing Figures

FILM HANDLING CASSETTE ASSEMBLY

BACKGROUND OF THE INVENTION

The present invention is addressed to photographic film handling cassettes from which the film strip need not be removed during the exposure, processing and projection operations. Exemplary of such systems are those described in prior U.S. Pat. No. 3,615,127 of Edwin H. Land and U.S. Pat. No. 3,641,896 of Rogers B. Downey. As shown and described therein, each of the systems of the aforementioned patents employs a photographic film cassette which includes a first housing section adapted to be mated with a second housing section.

During the manufacture of the cassette, the various components necessary for exposure, processing and projection are individually located in their operative positions within one of the housing sections. The other housing section, which acts as a coverplate, is finally mated in nested relationship with the one housing section to form the closed cassette container. In order to facilitate their subsequent joining, the first and second housing sections are configured having a lateral space or gap between them. Accordingly, the nesting of one section within the other must be made with exact precision for assuring the proper joining of the individual sections.

The housing sections of the closed cassette container are further configured to provide a light-labyrinth at adjoining portions of the housing sections. The light-labyrinth is provided to effectively control ambient light from entering the cassette container and prematurely exposing or fogging the film strip contained therein. Due to the relatively light weight flexible construction of the housing sections of the cassette, however, the sections may be positioned relative to one another such that the light-labyrinth may not be effective to control ambient light from entering the cassette prior to the final joining of the two sections. Under such circumstances, hard assembly and final joining of the cassette would have to be made under darkroom conditions, thereby adding additional expense and time to the mass production of the film container.

The necessity for temporarily retaining the two sections in properly spaced relation to each other prior to their subsequent joining is strengthened by the need for retaining the internal components of the cassette in their operable positions. The individual components may be merely placed upon spindles for example and may be moved out of their operable positions if they are not statically retained during the cassette's assembly. In addition, the present cassette is formed with minimal internal space available for conventional alternate methods of providing for a peripheral light seal and an evenly spaced lateral gap between the mated housing sections prior to their subsequent joining.

Consequently, an important object of this invention is to provide an improved film handling cassette assembly.

Another primary object and feature of the present invention is to provide a film handling cassette assembly including first and second housing sections adapted to be mated to each other and means for releasably securing the housing sections to each other.

A further feature and object of the present invention is to provide a film handling cassette assembly including substantially planar first and second housing sections adapted to be mated with each other in a loosely nested relationship for forming a relatively flat and substantially closed container for photographic film, and means, spaced from the periphery of the housing sections, for releasably securing the housing sections to each other and combine the internal components in proper position, to provide an easily assembled motion picture film handling cassette.

Further objects, features and advantages of the invention will in part be obvious and will in part become apparent as the following description proceeds.

SUMMARY OF THE INVENTION

A multipurpose film handling cassette assembly in accordance with the present invention includes a first housing section having a relatively large, flat first planar wall portion and a second housing section having a similar large, flat second planar wall portion. Additionally formed about the peripheries of both the first and second planar wall portions are peripheral edge walls. The edge wall of the second planar wall portion is configured to fit within the edge wall of the first planar wall portion for providing a light-tight seal about the line of contact of both edge walls. The edge walls of both planar wall portions are further configured such that a lateral gap is formed between portions of both edge walls. The gap or space is provided for facilitating the subsequent ultrasonic welding of the two housing sections together. Moreover, the gap must be evenly provided about the total periphery of the edge walls for insuring the proper joining of the two.

Substantially spaced from the peripheral edge walls of both planar wall portions and located proximate the center of the cassette assembly is a securing arrangement adapted to temporarily retain the two housing sections together prior to their subsequent joining. The securing assembly is also operative to bias the housing sections toward each other for insuring the above-mentioned light-tight seal. The securing arrangement, in addition to temporarily holding the two housing sections together, is configured to provide for the precise lateral location of one planar wall portion and its peripheral edge wall relative to the other planar wall portion and its peripheral edge wall such that an evenly spaced lateral gap is provided between the peripheries of both edge walls. Moreover, the securing arrangement is configured to permanently provide for vertical spacing between the two planar wall portions for preventing movement of the planar wall portions both away and toward each other. As a result, any possible binding frictional engagement between moving elements contained within the cassette and the planar wall portions is obviated.

In the illustrated embodiment, the securing arrangement of the present invention includes a selectively tapered pin extending from a centrally located portion of the interior facing portion of one planar wall portion. Positioned on the opposite planar wall portion in engageable position with the tapered pin is a hollowed column or post. The hollowed column is selectively deflectable when engaged by the tapered pin for securing both planar wall portions together and for selectively biasing one towards the other for insuring the light-tight seal of the peripheral edge walls of both. The hollowed column is configured to permit the tapered pin to engage the opposite planar wall portion from which it extends for providing a precise spacing element between the two planar wall portions.

BRIEF DESCRIPTION OF THE DRAWINGS

The novel features that are considered characteristic of the invention are set forth with particularity in the appended claims. The invention itself, however, both as to its structure and its operation together with the additional objects, features and advantages thereof will best be understood from the following description of the preferred embodiment when read in connection with the accompanying drawings wherein:

DESCRIPTION OF THE PREFERRED EMBODIMENT

Figure 1:
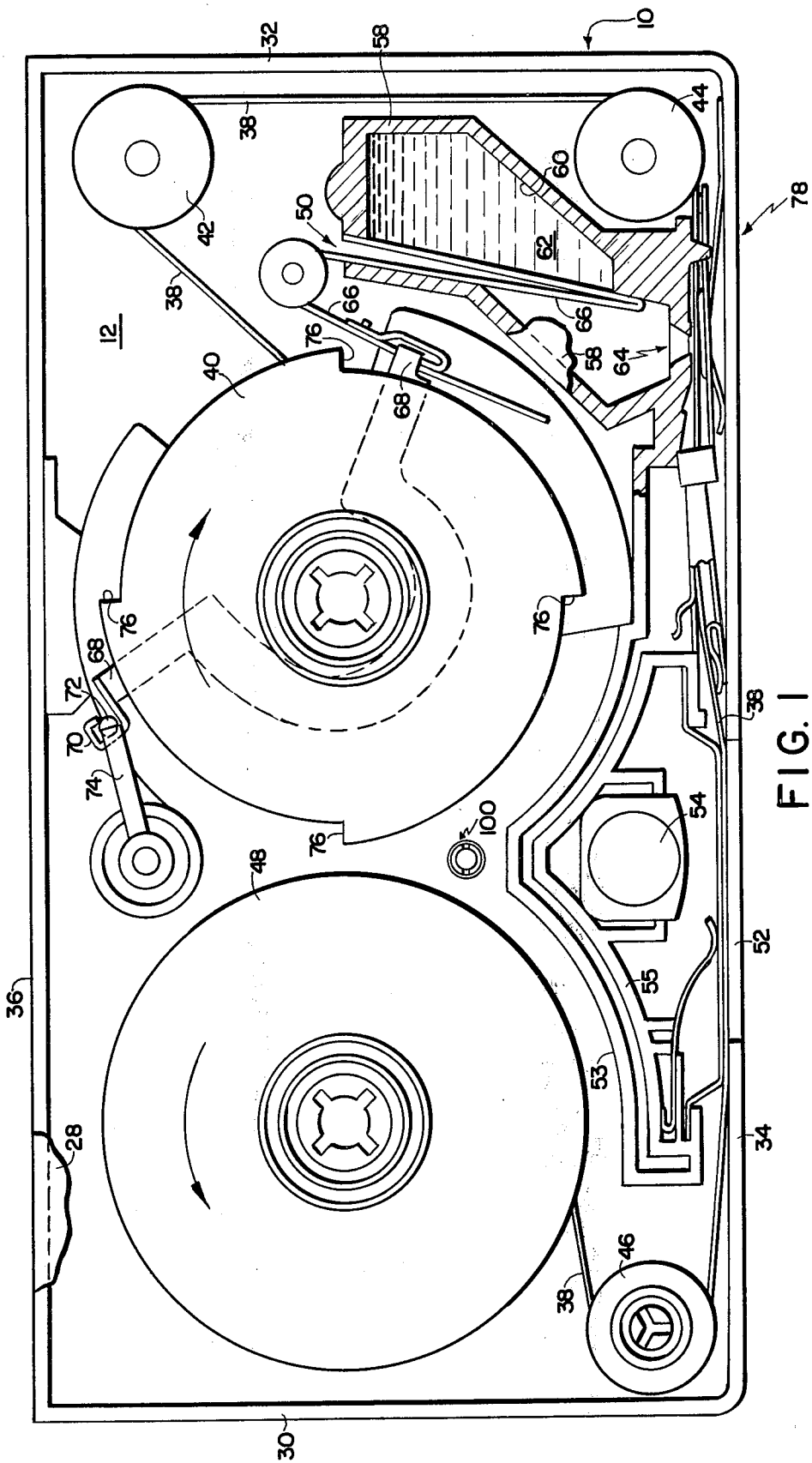
FIG. 1 is a diagrammatic plan view of a motion picture film handling cassette embodying a portion of the present invention.
Figure 2:
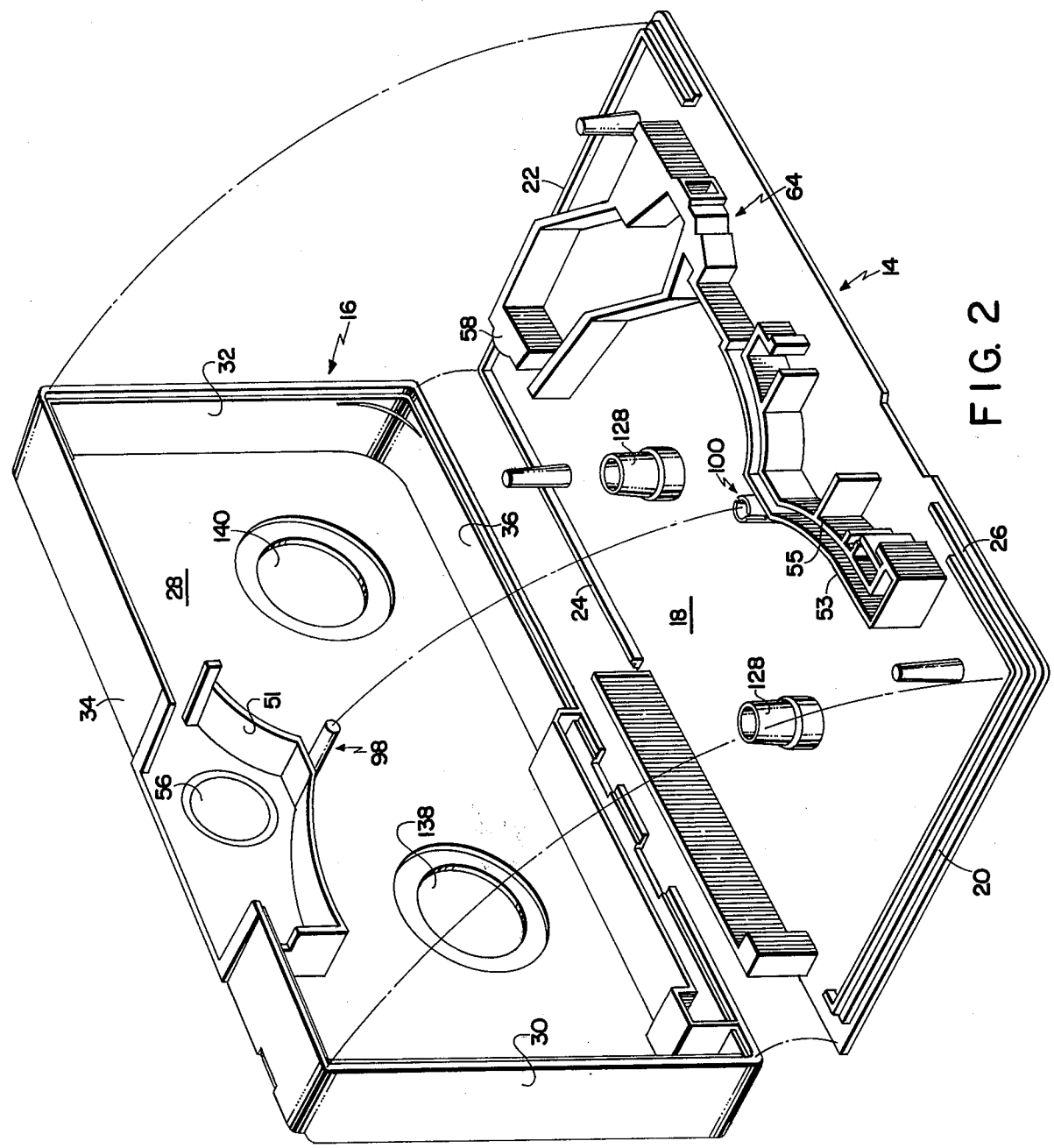
FIG. 2 is an exploded perspective view of the motion picture film handling cassette assembly of FIG. 1 with some of the internal components deleted for clarity.

The illustrated embodiment of this invention, which may be best understood by first referring to FIGS. 1 and 2 of the drawings, is associated with a multipurpose film handling cassette 10 of the type described in the above-mentioned United States patents. The cassette 10 includes the necessary components for the substantial automatic processing of a strip of motion picture film contained therein. It should be understood, however, that while the invention disclosed herein is particularly applicable to cassettes of the type described in the aforementioned patents, it is not restricted to the same and may, of course, be applicable to any multipurpose film handling cassette.

As shown in FIGS. 1 and 2, the cassette 10 comprises a generally parallelepiped casing or housing 12 constituted by first and second housing sections 14 and 16, respectively. First housing section 14 includes a first planar wall portion 18 and relatively short side edge walls 20 and 22 and short top and bottom edge walls 24 and 26, respectively, formed about substantially all of the periphery of the first planar wall portion 18. Second housing section 16 is constituted by a second planar wall portion 28 including peripherally formed side edge walls 30 and 32 and top and bottom edge walls 36 and 34, respectively. The specific configurations of all of the above-noted edge walls will be discussed below.

When first housing portion 14 and second housing portion 16 are mated to form housing 12, they are capable of carrying a photographic film strip 38 which is permanently attached at one of its ends to a rotatable supply spool or reel 40 from which it extends within the housing 12 in an extended path around suitable rollers generally designated at 42, 44 and 46 to a take-up spool or reel 48 to which the opposite end of the film strip is attached. In its path within the housing 12, the film 38 extends across a normally inoperative film processing station 50 and across an opening 52 which functions at different times to facilitate both exposure and projection. For facilitating the latter operation, a prism 54 is mounted behind the film strip 38 in an adjoining relation to both the opening 52 and to an illumination aperture 56 of the second planar wall portion 28. Prism 54 and opening 52 are isolated from the remainder of cassette 10 by a light-labyrinth formed by a wall portion 51 on portion 28 which is configured to cooperate with two wall portions 53 and 55 formed on first planar wall portion 18. For a further understanding of the nature and operation of prism 54, reference should be made to U.S. Pat. No. 3,807,842 of Philip G. Baker.

In order to fully understand the operation of the cassette 10, it is advantageous to describe strip 38 which is utilized therein. Preferably, the strip 38 comprises a base (not shown) of any suitable transparent material carrying, at least over a photographically useful length, an emulsion of photosensitive coating (not shown) of any conventional variety as, for example, an emulsion capable of being developed by a monobath processing composition to form a positive transparency suitable for projection. A currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

A composite film assembly of this type, as well as processing compositions for producing a fully developed black and white image without the necessity of removing the developed negative image after processing is shown in prior U.S. Pat. No. 2,861,885 to Edwin H. Land, which issued on Nov. 25, 1958 for "Photographic Processes and Products." Other composite film assemblies capable of producing developed full color images without the necessity of removing the developed emulsion are shown in prior U.S. patents of Edwin H. Land, U.S. Pat. Nos. 2,726,154, issued December 6, 1955 for "photographic Product," and 2,944,894, issued July 12, 1960 for "Photographic Process Utilizing Screen Members."

Referring again to FIG. 1, the film processing station 50 generally comprises a housing 58 having a receptacle 60 retaining a source of processing fluid or composition 62 which communicates with a coating nozzle generally designated at 64. The fluid 62 which may, for example, be an aqueous alkaline solution such as is described in the aforementioned U.S. Pat. No. 2,861,885, is initially retained within the tub-like receptacle 60 by means of a tear tab 66. The tear tab 66 extends from the housing 58 to an actuating assembly generally designated at 68. The latter, as described in the aforementioned copending U.S. patent application Ser. No. 227,092, now U.S. Pat. No. 3,785,725 extends beneath the supply spool 40 to a hook-like end member 70 which is releasably latched to an upright post 72 and in engagement with a cam member 74. Upon insertion of the cassette 10 into the projector (not shown), the cam 74 is appropriately displaced by a cassette-latching shaft (not shown) of the projector to drive the hook 70 from the post 72 and into engagement with one of the four teeth 76 of the supply spool 40 under the urging of a spring (not shown). Then upon subsequent rotation of the spool in the rewind direction shown by the arrow in FIG. 1, the actuating assembly 68 is similarly rotated to tear the tab 66 from covering relationship with the receptacle 60 and thereby releases its fluid 62 to the nozzle.

Located beneath the exterior surface of the nozzle 64 is a pressure pad and fluid application assembly 78 for selectively cooperating with the film strip 38 for biasing it into contact with nozzle 64 during the processing operation of the cassette. Additionally provided within cassette 10, substantially between reels 40 and 48, proximate the center of cassette 10, is a securing assembly 96, the specific details of which will be described below.

Figure 4:
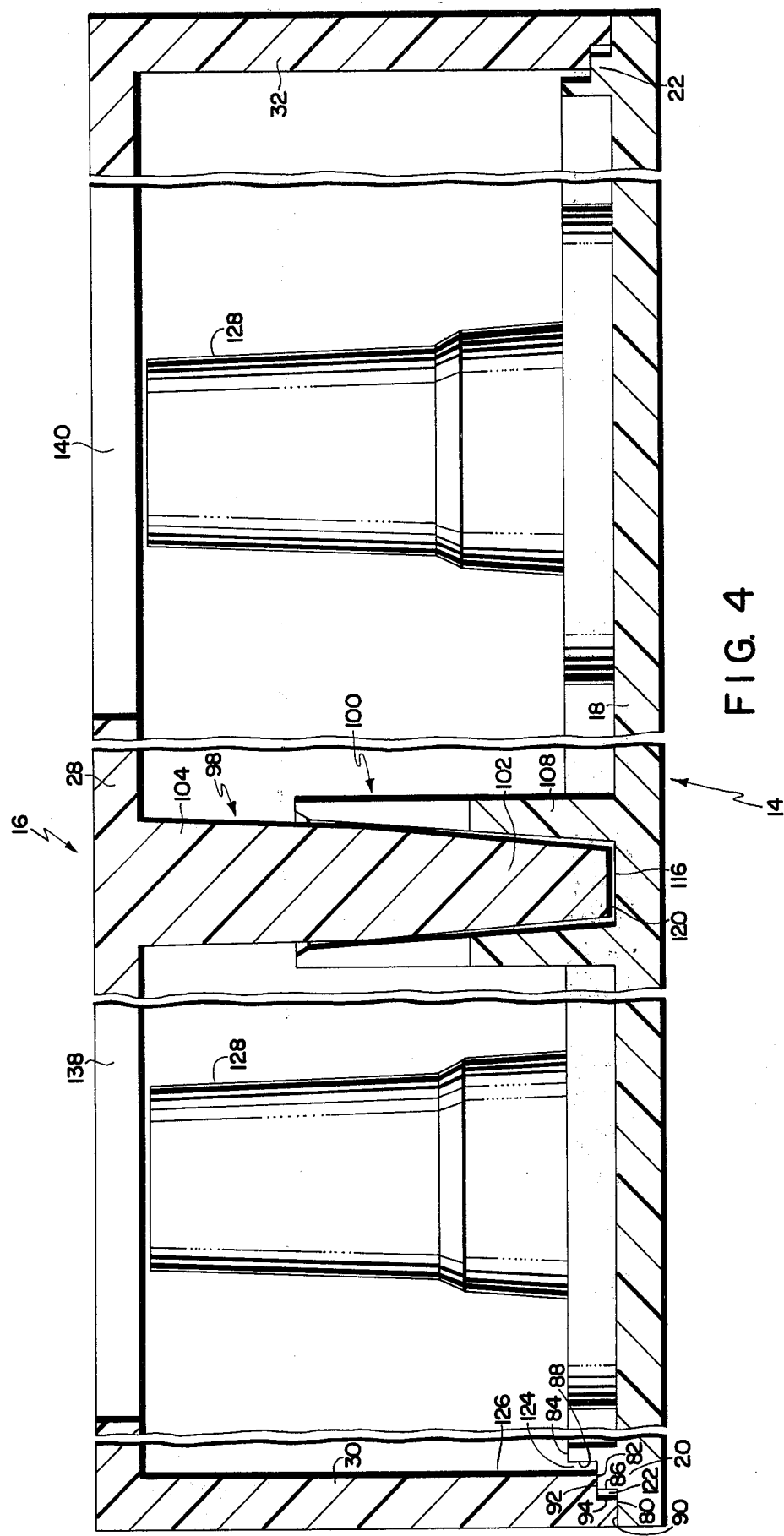
FIG. 4 is a sectional view of the cassette assembly of FIG. 3 taken through the lines 4—4.
Figure 5:
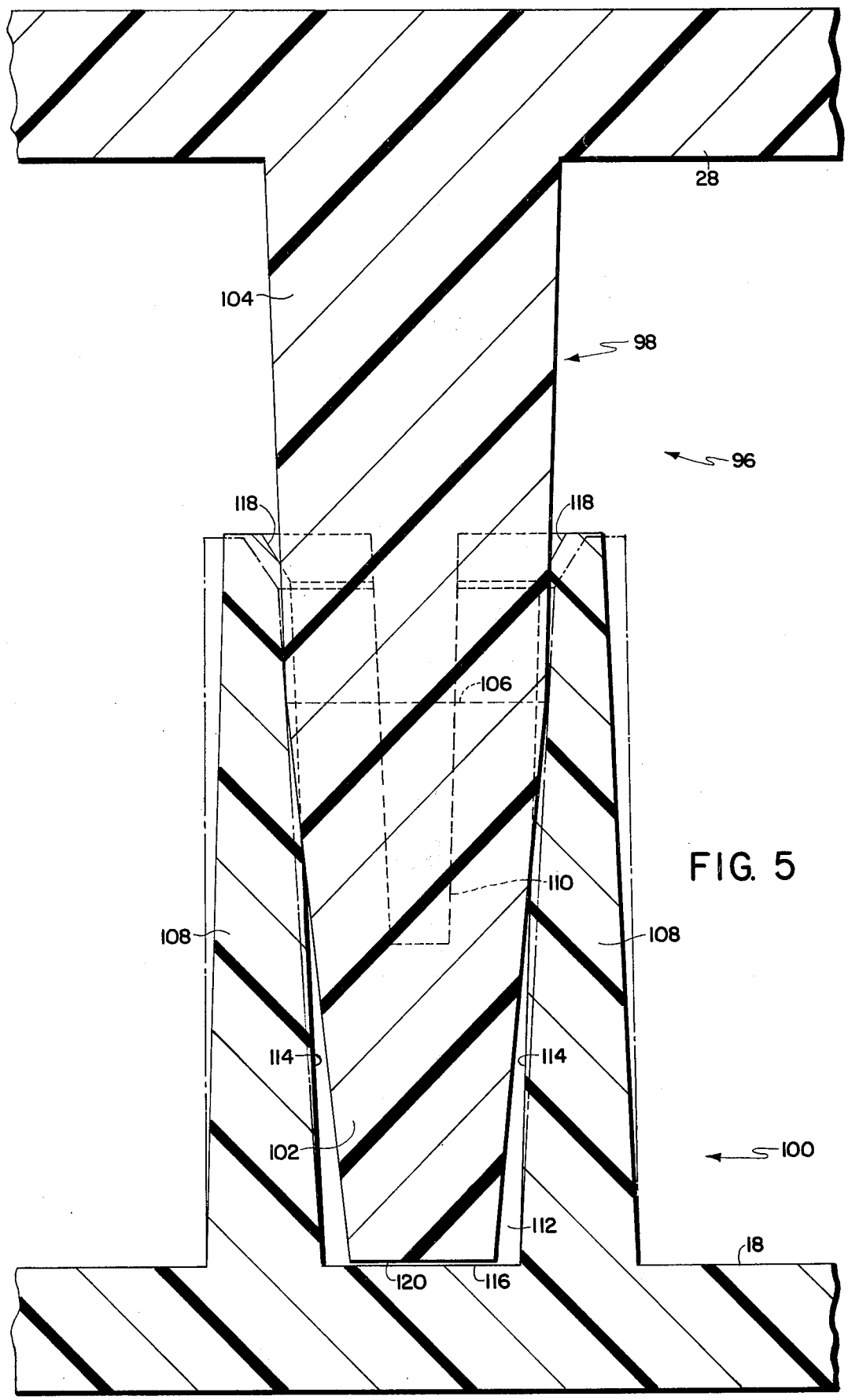
FIG. 5 is a sectional view of a portion of the cassette assembly of FIG. 3 taken through the lines 5—5.

Referring to FIGS. 4 and 5, there is shown a sectional view of the cassette assembly and the securing assembly of the present invention. Securing assembly 96 includes a pin or extension 98 formed on planar wall portion 28 and a hollowed column 100 formed opposite pin 98 on planar wall portion 18. Pin 98, extending from planar wall portion 28, is cylindrically formed and is configured having a double taper. In particular, pin 98 includes an end portion 102 and a base portion 104. End portion 102 is configured having a sharper taper than the taper of base portion 104 for facilitating the entry of pin 98 into hollowed column 100. The taper of end portion 102 and the taper of base portion 104 of pin 98 are configured to intersect at a line 106 extending about the circumference of pin 98.

Mounted opposite pin 98 on first planar wall portion 18 is hollowed column 100. Hollowed column 100 is formed having a generally cylindrical shape and includes a vertical wall portion 108. Vertical wall portion 108 includes a slit 110 formed through a portion thereof for permitting the selective deflection of column 100 when pin 98 is captured therein. The interior 112 of column 100 is formed by generally tapered interior side walls 114. Interior side walls 114 have a taper which makes the mouth of the hollowed column wider than the bottom interior of the column. It should also be noted in this regard, that the interior bottom portion 116 of the interior 112 of column 100 is coplanar with the interior plane of first planar wall portion 18.

Formed about the mouth of hollowed column 100 is a cutaway portion 118. Cutaway portion 118 establishes a funnel-like entrance for the pin 98 into the hollowed interior 112 of hollowed column 100. Accordingly, the location of pin 98 relative to hollowed column 100 is facilitated due to both the funnel-like entrance of column 100 and the selectively formed taper on end portion 102 of pin 98.

When pin 98 is correctly positioned within the interior 112 of hollowed column 100, vertical wall portions 108 are deflected outwardly from their full line positions to those which are shown in long dashed lines. The deflection of vertical walls 108 is caused by the engagement of pin 98 about line 106 with the interior wall portions 114 of column 100. The line of intersection 106 between the taper of base portion 104 and end portion 102 of pin 98 provides a localizing frictional engagement point between pin 98 and the interior wall 114 of column 100. Accordingly, the forces which retain pin 98 within column 100 are greater due to the frictional localization between pin 98 and the interior of column 100. Pin 98 and column 100 are configured such that when pin 98 is captured by column 100, the very tip or end 120 of pin 98 bottoms out in the interior bottom portion 116 of column 100. The exact purpose of this configuration will be more clearly described below.

As mentioned previously, FIG. 4 represents a cross-sectional view of the cassette assembly of the present invention. As may be evidenced therein, all of the edge walls of both first housing section 14 and second housing section 16 are formed having a stepped configuration at their points of contact. The edge walls of first housing section 14 are constituted in part by a first horizontal stepped portion 80, a second horizontal stepped portion 82 and a third horizontal stepped portion 84. Also provided are two vertical wall segments 86 and 88, located between portions 80 and 82, and 82 and 84, respectively. Adapted to be mated with the edge walls of first housing section 14, the edge walls of second housing section 16 are constituted in part at their ends opposite planar wall portion 28 by a horizontal stepped portion 90 and a horizontal stepped portion 92. Additionally provided between stepped portions 90 and 92 is a vertical wall segment 94. Stepped portion 92, of the edge walls of second housing section 16, is configured to engage stepped portion 82 of first housing section 14 for spacing both planar wall portions from each other at their peripheries and for providing a point of bead of contact between the two edge walls for light sealing and for joining of the two. With regard to the last mentioned function, there is provided on horizontal stepped portion 82 an ultrasonic welding energy director (not shown) which aids in the ultrasonic welding of both housing sections 14 and 16 to each other.

Housing sections 14 and 16 are joined together through the use of ultrasonic welding, a commonly available method of joining plastic and plastic-like products. Ultrasonic welding, however, produces flashing and sputtering which, in the case of a precision film handling cassette, is aesthetically undesirable and which may cause damage to the film strip itself. Accordingly, the edge walls of both housing sections 14 and 16 are configured to provide lateral gaps or spaces adjacent the ultrasonic energy director (not shown) located on stepped portion 82 of the first housing section's edge walls. A lateral gap 122 is therefor provided between vertical wall segment 86 and 94. Additionally, a lateral gap 124 is provided between vertical wall segment 88 and the interior 126 of the edge wall 30 of second housing section 16. Lateral gap 122 is operative to absorb any flashing within the cassette edge walls which would otherwise be formed about the exterior periphery of the mating between first and second housing sections 14 and 16. Such flashing on the exterior of the cassette in addition to being unsightly, requires expense and time for its removal. Lateral gap 124, on the other hand, not only absorbs any flashing formed from ultrasonic welding impinging in the already crowded interior of cassette 10, but also provides a "sink" for any spattering of plastic due to the welding which might damage any of the film strip contained within cassette 10.

It should become apparent from the foregoing discussion that lateral gaps 122 and 124 are not only necessary with the cassette structure, but in addition, must be provided about all or most of the periphery of adjoining edge wall portions of both housing sections 14 and 16. A large lateral gap provided at one end of the cassette with no gap at the opposite end of the cassette does not satisfy the total lateral gap requirement. Due to the precision required to provide an evenly spaced peripheral gap of the relative size in cassette 10, securing assembly 96 is configured to statically retain both first and second housing sections 14 and 16 laterally with respect to each other. Specifically, the components of securing assembly 96, including pin 98 and hollowed column 100, are configured to prevent any substantial lateral movement of one planar wall portion relative to the other. This is provided by the precise fit between pin 98 and hollowed column 100. The precise fit not only provides the lateral gap in one direction, but also provides it in the lateral direction perpendicular to the first. Accordingly, the lateral gaps 122 and 124 are provided about the total periphery of the mating between the edge walls of both first and second housing sections 14 and 16.

The securing assembly 96, in addition to temporarily securing the cassette and its internal components in an assembled position and insuring the presence of even lateral gapping, also aids in the establishment of a light seal for the cassette prior to ultrasonic joining. As noted previously, the film strip 38 is one of the final elements to be incorporated within first housing section 14 during the cassette's assembly prior to its mating with the second housing section 16. The mating of the first and second housing sections substantially completes the final assembly of the cassette with the exception of possible testing before final welding. Such testing may relate to any number of elements or operations, the specific nature of which is unimportant to the scope of this application. The final cassette assembly is secured from ambient light by the light-labyrinth provided by the stepped portions of the edge walls and engagement of horizontal stepped portions 82 and 92. The securing assembly 96 is operative to provide a bias of one planar wall portion toward the other planar wall portion at the periphery of each for insuring the light-tight engagement between horizontal stepped portions 82 and 92. Specifically, pin 98 is frictionally engaged by the interior wall side walls 114 of hollowed column 100 along the circumferal line 106. Due to the fact that pin 98 is just slightly shorter than the distance between the interiors of planar wall portions 18 and 28 at their peripheries, there is a slight biasing of the planar walls toward each other proximate securing assembly 96 when pin 98 bottoms out in portion 116 of column 100. This biasing is transferred to the edge walls of both housing sections for insuring the proper light-tight engagement between the portions 82 and 92 prior to ultrasonic welding. As a result, an inexpensive and light-sealing utilization of the securing assembly 96 is provided apart from its lateral spacing function.

As described in connection with FIG. 1, cassette 10 includes a supply reel 40 and a take-up reel 48 for alternately storing the film strip 38. Reels 40 and 48 are selectively actuated within the camera and projector systems (not shown) for rotation about their respective axes formed about spindles 128 thereby facilitating the advancement of film strip 38 within cassette 10. As may be evidenced from FIG. 5, reel 40 (as well as reel 48) is configured having a width X which closely approximates the interior distance Y between first and second planar wall portions 18 and 28. Reels 40 and 48 include a hub portion 126, rotatably mounted on the spindle 128 of cassette 10, and an upper flange 130 and a lower flange 132. Positioned on upper flange 130 is a ridge 134 which rides in a channel 136 provided on the interior of second planar wall portion 28. Ridge 134 and channel 136 act as a light-labyrinth for preventing light from entering two spool apertures 138 and 140 provided above reels 40 and 48 within planar wall portion 28. Apertures 138 and 140 permit the reel driving mechanisms (not shown) of a camera and projection system to drivably engage reels 40 and 48.

The approximation of reel width X to the interior cassette dimension Y is deliberately provided for minimizing the cassette's width. As previously noted, the interior spacing Y between planar wall portions 18 and 28 is provided at their peripheries by the engagement of the peripheral edge walls of both planar wall portions. However, both planar wall portions 18 and 28 are of a generally thin-walled construction which may be deflectable over a relatively large plane such as those presented by planar portions 18 and 28. As a result, there exists the possibility that one or both planar wall portions may be flexed inwardly about the flanges 130 and 132 during a given operation of the camera and projection system. Such a deflection has the potentiality of providing sufficient frictional contact with flanges 130 and/or 132 to prevent the rotation of either or both of reels 40 and 48. In order to prevent the frictional engagement between the planar wall portions 18 and 28 and flanges 130 and 132, the securing assembly 96 is configured to provide a spacing of portions 18 and 28 proximate the center of the cassette. While not at the exact center of the cassette, the securing assembly 96 is equi-distant from the reels 40 and 48 and is spaced from edge walls of both housing sections.

Figure 6:
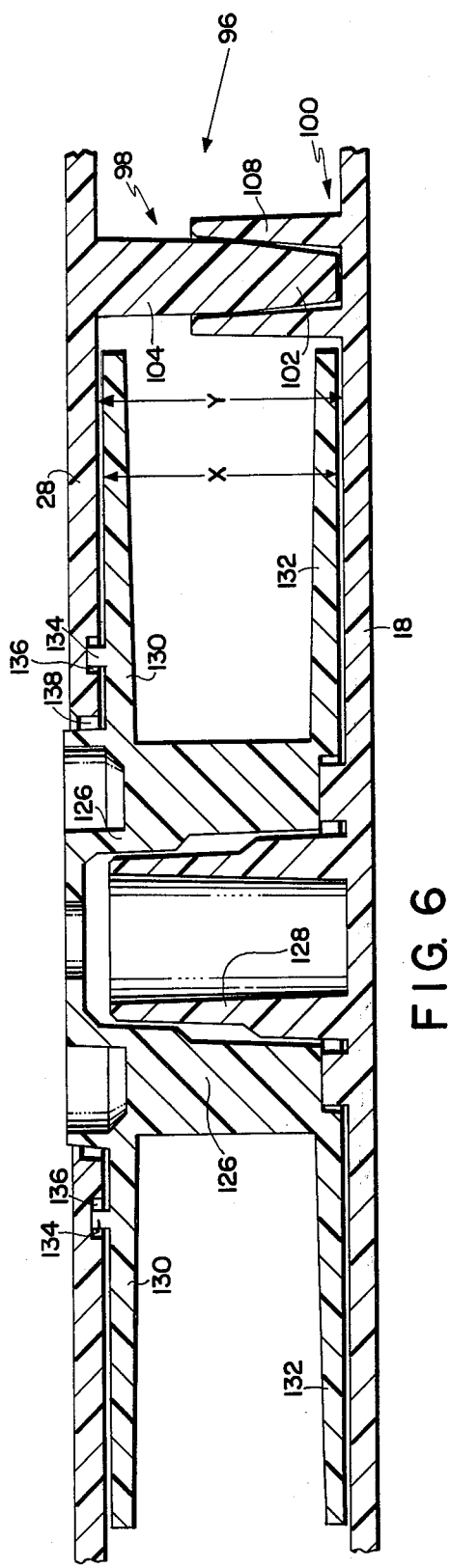
FIG. 6 is a sectional view of another portion of the cassette assembly of FIG. 3 taken through the lines 6—6.
Figure 3:
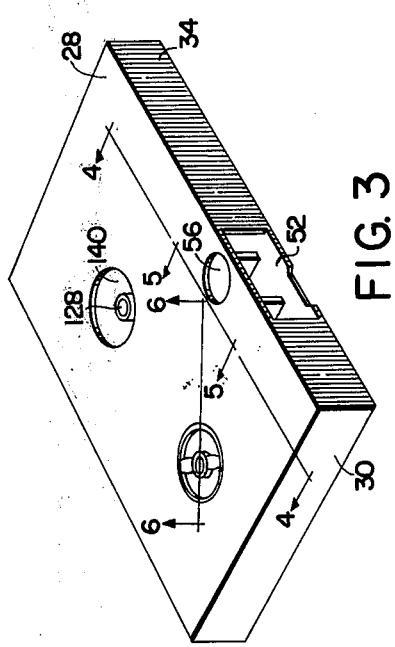
FIG. 3 is a perspective view of the cassette of FIG. 1.

Looking to FIGS. 4, 5 and 6, it is apparent that pin 98 of assembly 96 fully extends between first and second planar wall portions 18 and 28 and engages first planar wall portion 18 at interior bottom portion 116 of hollowed column 100. The securing assembly 96 is thus configured to permit end 120 of pin 98 to "bottom out" in interior bottom portion 116 for spacing purposes while additionally providing for the engagement between pin 98 and column 100. Accordingly, planar wall portions 18 and 28 are retained substantially parallel to each other not only at their peripheries, but proximate the center of cassette 10.

The securing assembly of the present invention provides a variety of functions within a film handling cassette assembly having limited available internal spacing. The securing assembly provides for the lateral spacing of one housing section relative to the other for facilitating the ultrasonic welding of the two. Additionally, the securing assembly is configured to provide a bias about the periphery of the mating between the two housing sections for insuring the light-tight integrity of the same. Moreover, the securing assembly provides for the even parallel spacing of two planar wall portions, constructed of a deformable material, for preventing the frictional binding engagement between the movable elements contained within the cassette and the planar wall portions. It should be emphasized that the securing assembly of the present invention provides for all of the abovenoted functions with a minimum of expense during manufacture and time during assembly within a cassette with minimal internal space.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. A photographic film handling cassette of the type capable of accommodating an unexposed film strip in a light-tight environment comprising first and second housing sections assembled together to define a film retaining housing having a first planar wall associated with said first section disposed in substantially parallel relation to a second planar wall associated with said second section and an edge wall extending between and serving to space said first and second planar walls at least around a portion of the periphery thereof, said housing sections being permanently joined to each other at at least a portion of said edge wall so as to provide a light-tight interior prior to the exposure of the film strip, at least one of said planar walls being a thin-walled deflectable construction, and means spaced apart from said edge wall for releasably securing said housing sections to each other said means including an elongated member extending from one of said planar walls and an opposed receiving member from the other of said planar walls wherein said elongated member is configured for frictional engagement by the opposed receiving member to provide a releasable holding force which operates to slightly deflect the thinwalled planar wall toward the other planar wall at a location spaced apart from the periphery thereof in this manner locating and peripherally biasing said housing sections into substantially parallel light-tight relation at least prior to said permanent joining.

2. The film handling cassette of claim 1 in which said elongated member is a pin extension and said receiving member is a selectively deformable hollowed column extending from the other of said planar walls, said pin extension and said hollowed column extending toward each other within the confines of said film retaining cassette in which said pin extension is configured to deform a portion of said hollowed column when said first and second housing sections are joined, said selectively deformable hollowed column being configured to locate and retain said pin extension and the planar wall it is formed on in a substantially static lateral relationship to said selectively deformable hollowed column and the planar wall it is formed on.

3. The film handling cassette of claim 2 in which said pin extension includes first means for guiding said pin extension into said selectively deformable hollowed column and said selectively deformable hollowed column includes second means for guiding said pin extension into said selectively deformable hollowed column when said first and second housing sections are mated in which said first guiding means is a selectively formed taper on said pin extension, said pin extension being configured such that the small end of the taper is moved into engagement with said selectively deformable hollowed column before the remainder of said pin extension and said second guiding means, included on said selectively deformable hollowed column, is formed as a funnelled portion of said hollowed column for guiding said pin extension into the hollowed portion of said selectively deformable hollowed column.

4. A photographic film handling cassette comprising first and second housing sections permanently joined together to define a film retaining housing having a first planar wall associated with said first section disposed in substantially parallel relation to a second planar wall associated with said second section and an edge wall extending between and serving to space said first and second planar walls at least around a portion of the periphery thereof, said housing sections also being mated to each other in a nested relation to define a given lateral gap between the nested portions at at least a portion of said edge wall portion which gap facilitated the permanent joining of said housing sections at said edge walls, at least one of said planar walls being of thin-walled deflectable construction, means spaced from said edge wall for releasably securing said housing sections to each other, said securing means including means for biasing said housing sections into said nested relationship and for precisely locating said housing sections with respect to each other so as to provide said lateral gap of said nested portions prior to said subsequent joining and for locating and restraining said planar walls in said substantially parallel relation prior to said joining and flashing material disposed within said lateral gap as a result of said permanent joining of said housing sections.

5. The film handling cassette of claim 4 in which said first and second planar walls are spaced from each other at their peripheries a given distance by said edge wall, said securing means including extension means formed on one of said planar walls and means, formed on the other of said planar walls, adapted to receive said extension means, said extension means and said means adapted to receive said extension means being configured to bias said housing sections into said nested relationship.

6. The film handling cassette of claim 5 in which said extension means, formed on one of said planar walls is of a length less than said given distance said first and second planar walls are separated at their peripheries for biasing said first and second housing sections into engagement with each other and statically retaining said first and second housing sections together.

7. The film handling cassette of claim 6 in which said means adapted to receive said extension means is configured to frictionally engage said extension means for releasably securing said first and second housing sections to each other, said receiving means being further configured to permit said extension means to engage said portion of the other of said planar walls for spacing said first and second planar walls from each other a given distance slightly less then the spacing provided by said edge wall.

8. The film handling cassette of claim 7 in which said extension means is a pin extension formed on one of said planar walls extending toward the other of said planar walls and said means adapted to receive said extension means is a hollowed column extending from the other of said planar walls wherein said hollowed column is configured to be selectively deformable by said pin extension when said pin extension and said hollowed column are joined, said hollowed column being configured to locate and retain said pin extension and the planar wall it is formed on in a substantially static relationship laterally to said hollowed column and the planar wall it is formed on and for retaining said first and second planar walls in a substantially static relationship vertically.

9. The film handling cassette of claim 8 in which said pin extension includes a first tapered portion, located at the end of said pin extension opposite the planar wall it is formed on for aiding in the location of said pin extension into said hollowed column, and a second tapered portion extending from the other end of said pin extension adjacent the planar wall it is formed on, said second tapered portion being formed such that the smaller end of the taper is proximate said first tapered portion wherein said pin extension is in frictional engagement with said hollowed column when the two are joined, and the intersection between said first and second tapered portions of said pin extension determine the location of frictional engagement between said pin extension and said hollowed column, said intersecting tapered portions selectively deforming said hollowed column for providing a holding force for releasably securing said pin extension in said hollowed column.

10. The film handling cassette of claim 9 in which said hollowed column is configured to frictionally receive said pin extension formed on one of said planar walls and to permit the passage of said first tapered portion into said hollowed column such that a portion of said pin extension is engageable with the other of said planar walls for spacing said planar walls from each other a distance slightly less than the spacing provided by said edge wall throughout said film handling cassette.

11. A method for assembling a photographic film handling cassette from two housing sections of the type having deflectable thin walled portions comprising the steps of:

positioning an unexposed photographic film strip relative to one of said housing sections for predetermined guided movement with respect thereto, said step of photographic film strip positioning occurring in an ambient condition sufficiently darkened to prohibit the premature exposure of said photographic film strip;

releasably securing the other of said housing sections to that housing section to which said photographic film strip is positioned in a manner which provides a substantially light-tight sealing arrangement around at least a portion of the periphery of said secured housing sections as well as interiorly of said housing sections; said housing sections being releasably secured by urging one of said housing sections toward the other housing section at a position spaced apart from said periphery and substantially opposite an elongated member which extend from one housing section in opposed relation to a receiving member from the other housing section, said urging being of sufficient force to simultaneously move said elongated member into frictional engagement with said receiving member while at the same time deflecting a major wall portion of one housing section to peripherally bias said housing section into light-tight sealing engagement with each other wherein said housing sections are also releasably secured in an ambient condition sufficiently darkened to prohibit the premature exposure of said photographic film strip within said light-tight sealing arrangement and permanently joining said housing sections about the light-tight joined periphery thereof to permanently preserve the light-tight ambient condition for said photographic film strip until such time that the photographic film strip is deliberately exposed in the course of a photographic exposure operation, said permanent joining not necessarily occurring in a darkened ambient condition thus permitting visual control prior to, during and subsequent to said permanent joining operation.

12. The method of claim 11 wherein said housing sections are releasably secured to each other in a manner which also operates to bias said housing sections into nested relation with each other while at the same time providing a substantially evenly spaced lateral gap between the nesting portions of said housing sections said lateral gap being of sufficient width to absorb flashing material which would otherwise be formed about the nested portions during the permanent joining operation.

* * * * *